United States Patent Office 3,669,678
Patented June 13, 1972

3,669,678
FOOD COMPOSITION PREPARED FROM WHEY AND COMMINUTED SESAME
John H. Kraft, Winnetka, Ill., assignor to John Kraft Sesame Corporation, Paris, Tex.
No Drawing. Continuation-in-part of application Ser. No. 731,290, May 22, 1968. This application Nov. 16, 1970, Ser. No. 90,055
Int. Cl. A23c 21/00; A23l 1/00; A21d 13/00
U.S. Cl. 99—28                               13 Claims

ABSTRACT OF THE DISCLOSURE

A composition in liquid, semi-solid, or solid form is prepared from comminuted sesame and whey, which is useful as a food or as an ingredient of foods, especially as a drink or beverage, and in bread, cakes, candy, ice cream, and other bakery products and confections.

---

This application is a continuation-in-part of my U.S. application Ser. No. 731,290, filed May 22, 1968, now abandoned.

BACKGROUND

The inveniton is concerned with the preparation of a food composition from sesame.

Sesame is primarily used in the form of its dehulled seed as a topping for rolls, bread, and bakery products. It has also been suggested for use in the form of a ground paste or butter as a base for dips and spreads. Since sesame is high in methionine, one of the highly nutritional amino acids, it would be desirable to make it available in new and improved compositions which are both highly nutritional and palatable.

OBJECTS

An object of the present invention is to provide a new and improved food composition containing sesame.

Another object is to provide a new and improved food product containing sesame which is highly palatable and nutritious.

An additional object is to provide a new and improved food product in powder form containing sesame.

A further object is to provide a food composition, which is prepared from ground dehulled sesame seed, sesame seed cake and/or extracted sesame seed cake and is useful as a food or as an ingredient of foods, especially in a drink or beverage or in bread, cakes, candy, ice cream and other bakery products and confections. Other objects will appear hereinafter.

BRIEF SUMMARY OF THE INVENTION

In accordance with the invention it has been found that a new and useful food composition can be prepared by mixing comminuted sesame and whey. The composition can be used as a liquid, or a semi-solid, with or without added flavoring ingredients, but is preferably converted to a powder, for example, by spray drying or drum drying.

DETAILED DESCRIPTION OF THE INVENTION

The term "comminuted sesame" as used herein is intended to include and cover ground dehulled whole sesame seed, sesame seed cake containing 10% to 20% oil (i.e., the cake which remains after all except 10–20% of the sesame oil has been expelled) and extracted sesame seek cake containing less than 10% sesame oil, usually around 0.5% sesame oil (i.e., the cake which remains after the sesame oil has been solvent extracted). Mixtures of any two or more types of comminuted sesame are also contemplated.

The term "whey" ordinarily means the liquid remaining after the removal of casein and fat from milk. Whey can be made from skim milk, whole milk or buttermilk. It is usually obtained as a by-product of cheese making processes. Usually, whey contains about 94% by weight water and about 6% by weight solids. The solids are primarily milk sugars, minerals and water soluble proteins. The term "whey" as used herein includes ordinary whey; delactosed whey (which is higher in protein); demineralized, delactosed whey; and demineralized whey as well as mixtures of two or more of said forms of whey.

When a dried composition is prepared in accordance with the invention, a liquid comminuted sesame-whey mixture is first heated. The heating is believed to produce some interaction between the components of the ingredients. A preferred method is to forewarm the mixture at 145–205° F. for thirty minutes or at a higher temperature for a shorter period of time. The mixture is then evaporated under 18–27 inches of mercury at 105–165° F. to a concentration of 30–55% by weight solids and the concentrate spray dried. The ingredients could also be dry blended. However, it is more difficult to produce intimate association and less interaction of the components is likely.

The dried compositions can be used as such or they can be blended with other ingredients, e.g., flavoring substances and/or taste intensifiers, and/or agents to increase water wettability, and/or suspending agents, e.g., salt, vanilla, sugar, cocoa, lemon, lime, orange, sodium glutamate, lecithin and/or carrageenin. Edible flavoring substances might constitute 0 to 50% by weight of the total solids; edible taste intensifiers 0 to 1%; edible water wetting agents 0 to 2%; and edible suspending agents 0 to 3%.

In order to make a drink or beverage the dried compositions are reconstituted with water in sufficient amount to give a final product containing about 12% to about 20% solids, preferably 15% to 20% solids.

The compositions of the invention comprise the following ingredients and proportions:

| Ingredients | Parts by weight | |
|---|---|---|
| | Range | Preferred |
| Comminuted sesame | 1–15 | 8 |
| Whey solids | 4–10 | 6 |

The weight ratio of comminuted sesame to whey solids is usually within the range of 2:1 to 1:2. Water can be present in various amounts depending upon the desired consistency of the product. Thus, a liquid product might contain 80–99% by weight water, a semi-solid product might contain 40–60% by weight water and a powdered product would contain less than 15% by weight water. Usually, a dried or powdered product will contain some moisture because it is not practical to remove all of the water and even when a product is thoroughly dried some atmospheric absorption of moisture will occur unless the product is immediately packaged in containers that are sealed from the atmosphere.

Sesame seed is a high fat and high protein seed which is very useful for nutritive purposes. It may be moisture-free or the moisture content can be higher, for example, up to 8% by weight. Wet seed from the dehulling operation can be used directly when the seed is dehulled by wet processing methods. Dry seed can also be used. The sesame can be ground before mixing it with the whey or after mixing it with the whey.

Cheese whey from Cheddar, Swiss or Italian cheese making usually has a pH around 5.8 to 6.2. Whey from cottage cheese making has a substantially lower pH. Any of these forms of whey can be used.

Where the whey is too acidic a neutralizing agent can be added.

The following examples illustrate the practice of the invention.

EXAMPLE I

Eight (8) parts by weight of ground dehulled sesame seed are mixed with 100 parts of whey having a pH of about 6.0 and containing approximately 6% by weight whey solids and 94% water.

The mixture is heated to 185° F. for 30 minutes and evaporated to 35% total solids in a double effect evaporator at 27 inches of mercury vacuum in the second effect. The resultant mixture is then spray dried in an apparatus of the type used for making powdered milk by spray drying. A white powder is obtained which resembles powdered milk. The weight ratio of sesame to whey solids is approximately 4:3. The taste of the product is excellent.

EXAMPLE II

Eight (8) parts by weight of ground dehulled sesame seed are mixed with 100 parts by weight of whey having a pH of about 4.6 and containing approximately 6% by weight whey solids and 94% water.

The mixture is heated to 350° F. (177° C.) under pressure with removal of water until a mixture suitable for spray drying is obtained. The resultant mixture is then spray dried in an apparatus of the type used for making powdered milk by spray drying. A white powder is obtained which resembled powdered milk. The weight ratio of sesame to whey solids is approximately 4:3. The taste of the product is excellent.

The following example illustrates the utility of the composition in making bread.

EXAMPLE III

A standard 70/30 sponge and dough white bread formula was used as follows:

Sponge stage

| Ingredients: | Grams |
| --- | --- |
| Flour | 700 |
| Water | 476 |
| Yeast food | 5 |
| Yeast | 25 |

Dough stage

| Ingredients: | Grams |
| --- | --- |
| Flour | 300 |
| Water | [2] 204 [3] 234 |
| Salt | 20 |
| Sugar (dextrose) | 60 |
| Lard [1] | --- |
| Non-fat dry milk [1] | --- |
| Calcium propionate | 2 |
| Monoglyceride | 5 |

[1] Experimental variables.
[2] Without milk.
[3] With milk.

Scale: 18.5 oz.
Bake: 19 minutes at 450° F.
Sponge fermentation 3.5 hours
Dough fermentation 20 minutes
Total mix: 4 minutes at 2nd speed on Hobart A-120 mixer, with McDuffee bowl and fork.

Two bread doughs were prepared with this formula. In dough No. 1, 4% by weight of the flour of dry whole milk (40 grams) and 2% by weight of the flour of lard (20 grams) were used with 59 minutes prooftime. In dough No. 2, 4% by weight of the flour of the composition of Example I (40 grams) and 1.4% by weight of the flour of lard (14 grams) were used with a prooftime of 61 minutes. The bread made from these two doughs were compared and found to be very similar. The No. 2 bread had a taste similar to that normally obtained with 4% nonfat dry milk. The specific volume in cubic inches per ounce was somewhat greater in the No. 2 bread, being 10.7 vs. 10.4. Both breads were excellent on the break and shred test, had very good crust color, good to very good texture and good aroma. Bread No. 2 had a slightly different grain and crumb structure from the control.

In a similar manner the product of Example I can be used in making bread.

The invention makes it possible to make bread with a sesame-whey product in place of nonfat dry milk or dry whole milk and with a reduction in the amount of shortening. The proportions of sesame-whey can vary but are preferably within the range of 2% to 6% by weight of the flour.

EXAMPLE IV

This example illustrates the preparation of a beverage mix and a beverage made from said mix.

The ingredients are:

| | Percent |
| --- | --- |
| Product of Example I | 59 |
| Baker's special sugar | 30 |
| Cocoa | 10 |
| Lecithin | 0.5 |
| Carrageenin | 0.5 |

These ingredients are intimately mixed to form a dry powder which can be packaged and sold as such. To make a beverage, the dry mix is reconstituted with water in sufficient amount to give a liquid product containing 15–20% by weight of said mix.

EXAMPLE V

A beverage mix is prepared by mixing the following solids:

| Ingredients: | Percent by weight |
| --- | --- |
| Partially defatted ground sesame cake containing 10–19% oil | 34 |
| Whey solids | 25 |
| Baker's special sugar | 30 |
| Cocoa | 10 |
| Lecithin | 0.5 |
| Carrageenin | 0.5 |

The resultant powdered mix is made into a beverage as in Example IV.

EXAMPLE VI

The procedure is the same as in Example I except that one-half of the ground dehulled sesame seed is replaced by ground sesame cake containing 10–19% oil obtained by expelling a portion of the oil from ground dehulled whole sesame seed.

The resultant product is useful in making bread as in Example III or in making a drink mix as in Example IV.

EXAMPLE VII

The procedure is the same as in Example I except that one-half of the ground dehulled sesame seed is replaced by extracted ground sesame cake containing about 0.5% sesame oil.

The resultant product is useful in making bread as in Example III or in making a drink mix as in Example IV.

EXAMPLE VIII

The procedure is the same as in Example I except that one-half of the ground dehulled sesame seed is replaced by soy flour. This gives a product containing substantial amounts of both methionine and lysine due to the fact that sesame is high in methionine and low in lysine while soy flour is high in lysine but low in methionine.

In a similar manner, other oil seed flours containing 0.5 to 20% oil, including, for example, peanut and/or cottonseed flours, and animal protein, e.g., casein, can be used to replace up to one-half of the sesame.

The dry powdered products can, if desired, be agglomerated by dispersing them in an air stream with steam added.

In general, a drink mix in accordance with the invention will contain for each part of sesame 0.5 to 2 parts by weight of whey solids, plus the flavoring ingredients (usually 1% to 50% of the total solids). Lecithin or other edible water wetting agent and carrageenin or other edible suspending agent will each constitute 0.5% to 1% by weight of the total solids.

In addition to the uses previously mentioned, the compositions of the invention can be used in making salad dressings, pudding, candy, cakes, ice cream, and other bakery products and confections. They can be used as such in liquid, semi-solid or solid state or they can be mixed with other substances of the type previously described. For some purposes, for instance, bread making, it may be desirable to add sodium diacetate, calcium propionate or other edible mold and rope inhibitors in mold and rope inhibiting amounts.

It will be understood that the invention is susceptible to some variation and modification in the manner of its practical application. In preparing the product described in Example II, Italian cheese whey was used. The sesame seed was ground in a Moorhouse mill. The whey was allowed to flow into the mill orifice at the same time a stream of white dehulled sesame seed flowed through the orifice. The mill was set to grind fine so that there were no discernible particles detectable when a small amount of the product was placed on the tongue. The particle size was approximately within the range of 10 to 50 microns in diameter. During the grinding the whey solution was kept at 140° F. to prevent bacterial growth. The rate of flow of the seed was adjusted to 150 to 200 pounds per hour with a ¼ inch stream of whey flowing through the seed. Water can be used in grinding the seed but whey has the advantage that it combines with and emulsifies the fat from the seed. Water tends to separate the oil from the seed and the emulsification product is less stable. The combined product was pasteurized at 140° F. and then condensed to approximately 47% solids. At this consistency the product can be spray dried or used as such.

Surprisingly, the combination of sesame and whey, as previously described, improves the over-all palatability of both. Furthermore, the products obtained by heating the sesame and whey can be used in bread making to at least partially replace milk and shortening without significantly affecting loaf volume. These products are useful in all types of bread making including continuous mix bread whereas whey alone, casein alone and nonfat dry milk at the 6% level are known to have a loaf-depressant effect.

The invention is hereby claimed as follows:

1. A normally solid composition for use in making beverages, bread and other food products of enhanced protein content comprising 1-15 parts by weight comminuted sesame and 4-10 parts by weight whey solids, said comminuted sesame and said whey solids having been heated together in the presence of water at a temperature of at least 140° F. sufficiently to produce interaction between the components of said comminuted sesame and said whey solids and said product being thereafter dried and converted to discrete solid particles in which components of said comminuted sesame and said whey solids are intimately associated.

2. A composition as claimed in claim 1 in which the weight ratio of comminuted sesame to whey solids is within the range of 2:1 to 1:2.

3. A composition as claimed in claim 1 containing less than 15% by weight water.

4. A composition as claimed in claim 1 in which the weight ratio of comminuted sesame to whey solids is approximately 4:3.

5. A composition as claimed in claim 1 in powder form consisting essentially of comminuted sesame and whey solids in a weight ratio of 2:1 to 1:2 and not more than 15% water.

6. Bread containing 2% to 6% of the weight of the flour of a composition as claimed in claim 5.

7. Bread containing 2% to 6% of the weight of the flour of a composition as claimed in claim 1.

8. A composition as claimed in claim 1 useful as a drink mix containing comminuted sesame and whey solids in a weight ratio of 2:1 to 1:2 together with flavoring ingredients in an amount of 1% to 50% by weight of total solids.

9. A drink consisting essentially of a composition as claimed in claim 8 dissolved in water in sufficient amount to give a solids concentration of 15-20% by weight.

10. A composition as claimed in claim 1 which also comprises casein in proportions not exceeding the amount of comminuted sesame and with the total of the comminuted sesame and casein not exceeding 15 parts by weight per 4 to 10 parts by weight of whey solids.

11. A composition as claimed in claim 1 which also comprises another comminuted oil seed containing 0.5% to 20% by weight oil in proportions not exceeding the amount of comminuted sesame and with the total of said comminuted oil seed and comminuted sesame not exceeding 15 parts by weight per 4 to 10 parts by weight of whey solids.

12. A process for preparing a food composition which comprises heating a mixture of comminuted sesame and whey to a temperature of at least 140° F. and converting the resultant mixture to a dried powder, said mixture comprising 1 to 15 parts of said comminuted sesame per 100 parts of whey.

13. A process as claimed in claim 12 in which the weight ratio of comminuted sesame to whey solids is within the range of 2:1 to 1:2.

References Cited

UNITED STATES PATENTS

| | | | |
|---|---|---|---|
| 828,251 | 8/1906 | Solliday | 99—90 R |
| 2,990,285 | 6/1961 | O'Neal et al. | 99—83 |
| 3,531,294 | 9/1970 | Glabau | 99—91 X |

RAYMOND N. JONES, Primary Examiner

J. R. HOFFMAN, Assistant Examiner

U.S. Cl. X.R.

99—57, 78, 90 R, 92, 134 R, 136